United States Patent
Harvey et al.

(10) Patent No.: US 9,752,039 B2
(45) Date of Patent: *Sep. 5, 2017

(54) THERMAL INK JET INK COMPOSITION

(71) Applicant: VIDEOJET TECHNOLOGIES INC., Wood Dale, IL (US)

(72) Inventors: Kyle Harvey, Elk Grove Village, IL (US); Michael Kozee, Wheaton, IL (US); Linfang Zhu, Woodridge, IL (US); Casey Robertson, Romeoville, IL (US); Anthony Selmeczy, Roselle, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/925,463

(22) Filed: Oct. 28, 2015

(65) Prior Publication Data

US 2016/0046817 A1 Feb. 18, 2016

Related U.S. Application Data

(63) Continuation-in-part of application No. 14/107,384, filed on Dec. 16, 2013, now Pat. No. 9,249,326, which is a continuation of application No. 13/252,293, filed on Oct. 4, 2011, now Pat. No. 8,632,630, which is a continuation-in-part of application No. 12/646,162, filed on Dec. 23, 2009, now Pat. No. 8,142,559, which is a continuation-in-part of application No. 12/059,753, filed on Mar. 31, 2008, now Pat. No. 8,142,558.

(51) Int. Cl.
| | |
|---|---|
| *C09D 11/36* | (2014.01) |
| *C09D 11/30* | (2014.01) |
| *C09D 11/328* | (2014.01) |
| *C09D 11/38* | (2014.01) |
| *C09D 11/32* | (2014.01) |
| *B41J 2/01* | (2006.01) |
| *C08K 5/04* | (2006.01) |

(52) U.S. Cl.
CPC ............. *C09D 11/36* (2013.01); *B41J 2/01* (2013.01); *C09D 11/30* (2013.01); *C09D 11/32* (2013.01); *C09D 11/328* (2013.01); *C09D 11/38* (2013.01); *C08K 5/04* (2013.01)

(58) Field of Classification Search
CPC ................................ C09D 11/36; C09D 11/50
See application file for complete search history.

(56) References Cited

U.S. PATENT DOCUMENTS

| | | | |
|---|---|---|---|
| 5,102,458 A | 4/1992 | Lent et al. | |
| 5,637,139 A | 6/1997 | Morelos et al. | |
| 5,693,127 A | 12/1997 | Nigam et al. | |
| 5,755,860 A * | 5/1998 | Zhu ........................ | C09D 11/50 106/31.05 |
| 5,837,042 A | 11/1998 | Lent et al. | |
| 6,645,280 B1 * | 11/2003 | Zhu ........................ | C09D 11/50 106/31.27 |
| 2003/0004225 A1 | 1/2003 | Sarma et al. | |
| 2006/0065145 A1 | 3/2006 | Martin et al. | |
| 2009/0246377 A1 * | 10/2009 | Robertson .............. | C09D 11/38 427/256 |

FOREIGN PATENT DOCUMENTS

WO 2008/031765 3/2008

* cited by examiner

*Primary Examiner* — Veronica F Faison
(74) *Attorney, Agent, or Firm* — Robert L. Wolter; Beusse, Wolter, Sanks & Maire PLLC

(57) ABSTRACT

A thermal ink jet ink composition includes at least 50% by weight volatile organic solvent selected from $C_1$-$C_4$ alcohols, $C_3$-$C_6$ ketones, $C_3$-$C_6$ esters, $C_4$-$C_8$ ethers, and mixtures thereof; a colorant; a humectant present in an amount from about 1% to about 30% by weight; from 0.3% to 8% by weight of a binder resin; and not more than 5% by weight water; wherein the ink composition is compatible with components of a thermal ink jet printer.

19 Claims, No Drawings

THERMAL INK JET INK COMPOSITION

CROSS REFERENCE TO RELATED APPLICATIONS

This application is a Continuation-In-Part of U.S. application Ser. No. 14/107,384 filed Dec. 16, 2013, which is a Continuation of U.S. application Ser. No. 13/252,293 filed Oct. 4, 2011, which is a Continuation-In-Part of U.S. application Ser. No. 12/646,162 filed Dec. 23, 2009, which is a Continuation-In-Part of U.S. application Ser. No. 12/059,753 filed Mar. 31, 2008, all of which are incorporated herein by reference in their entireties.

BACKGROUND OF THE INVENTION

Thermal ink jet (TIJ) print heads produce ink droplets from thermal vaporization of the ink solvent. In the jetting process, a resistor is heated rapidly to produce a vapor bubble which subsequently ejects a droplet from the orifice. This process is extremely efficient and reproducible. Modern TIJ print heads for industrial graphics applications are capable of generating uniform drops of 4 pL or smaller in volume at frequencies of up to 36 kHz or greater. Typical commercial TIJ devices are specifically designed to vaporize water or solvents that have physical properties close to those of water (e.g. high boiling point, large heat capacity, low molecular weight).

Although TIJ printing systems have been available for over 30 years, nearly all of the commercial inks available for thermal ink jet systems have been water-based, i.e. they contain more than 50% water. Such aqueous inks have one or more drawbacks such as long ink dry times or poor adhesion to semi-porous or non-porous substrates.

There is a desire for inks with attractive performance characteristics such as short dry times, long decap times and good adhesion when using a TIJ system to print onto semi-porous and non-porous substrates.

BRIEF SUMMARY OF THE INVENTION

The disclosure provides a thermal ink jet ink composition including one or more volatile organic solvents, one or more binder resins, and one or more colorants. In one aspect, the thermal ink jet ink composition includes at least 50% by weight volatile organic solvent selected from $C_1$-$C_4$ alcohols, $C_3$-$C_6$ ketones, $C_3$-$C_6$ esters, $C_4$-$C_8$ ethers, and mixtures thereof; a colorant; a humectant present in an amount from about 1% to about 30% by weight; from 0.3% to 8% by weight of a binder resin; and not more than 5% by weight water. The ink composition is compatible with components of a thermal ink jet printer. The colorant is preferably a fluorescent material.

In another aspect, the disclosure provides a printing system including a thermal ink jet cartridge containing a thermal ink jet ink composition. A thermal ink jet print head is adapted to direct a stream of droplets of the ink composition to a substrate. The thermal ink jet ink composition has a decap time of at least 15 seconds and a dry time of less than 5 seconds on a non-porous substrate when used in the thermal ink jet print head.

The disclosure also provides a thermal ink jet cartridge including a thermal ink jet ink composition.

The thermal ink jet ink composition of the invention has one or more of the following features: short dry times, long decap times, good adhesion to substrates, safety, and material compatibility with the ink cartridge. The preferred ink composition is one that has a slow rate of resistor buildup by using suitable binder resins, colorants, and additives. Decap time at the droplet level is the length of time that a nozzle can remain dormant and then be fired again without any significant reduction in droplet velocity, reduction in droplet weight, or change in droplet direction. Decap time at the print level is measured as the length of time that a print head can remain dormant and then be fired again without any significant degradation of print. A specific example of a decap time measurement is the maximum amount of idle time a system can undergo and still recover full nozzle function within the first 20% of a printed stairstep image (i.e. 80% of the print is intact). Fluids with good material compatibility are defined as those which do not degrade the ability of the TIJ cartridge to fire for some reasonable length of time that is meaningful to a customer. Kogation is a build-up on the print resistor that occurs after repetitive firings. The buildup reduces the rate of heat transfer from the resistor to the liquid ink. Kogation can reduce drop weight, change drop trajectory, lower drop velocity, or cause nozzles to become completely inactive. The thermal ink jet ink composition does not require heat assist (e.g., thermal driers) when printed on semi-porous and non-porous substrates.

DETAILED DESCRIPTION OF THE INVENTION

The invention provides a thermal ink jet ink composition comprising one or more volatile organic solvents, one or more humectants, one or more binder resins, and one or more colorants. A specific problem that occurs with TIJ inks is that of kogation. Kogation is a residue or build-up that deposits on the TIJ firing resistors during use, thus impeding performance via drop weight reduction, misdirected jets, or in extreme cases causing complete loss of nozzle function. Kogation occurs during high temperatures reached during repetitive resistor heating cycles and is usually attributed to materials or impurities in the ink that decompose, react, or become insoluble under these conditions.

In accordance with an embodiment, the thermal ink jet ink composition includes volatile organic solvents selected from $C_1$-$C_4$ alcohols, $C_3$-$C_6$ ketones, $C_3$-$C_6$ esters, $C_4$-$C_8$ ethers, and mixtures thereof. The volatile organic solvents are preferably selected from $C_1$-$C_4$ alcohols, $C_3$-$C_6$ ketones, and mixtures thereof. Examples of $C_1$-$C_4$ alcohols include methanol, ethanol, 1-propanol, and 2-propanol. Examples of $C_3$-$C_6$ ketones include acetone, methyl ethyl ketone, methyl n-propyl ketone, and cyclohexanone. Examples of $C_4$-$C_8$ ethers include diethyl ether, dipropyl ether, dibutyl ether and tetrahydrofuran. Examples of $C_3$-$C_6$ esters include methyl acetate, ethyl acetate and n-butyl acetate. The organic solvents, particularly alcohols, ketones, and esters, have an attractive feature that they provide better solvency to common binder resins, penetrate semi- and some non-porous substrate surfaces more readily, and evaporate more quickly than water based inks, thus reducing dry time and improving adhesion.

In particular embodiments the thermal ink jet ink compositions includes, as the volatile organic solvent(s), methyl ethyl ketone, ethanol, a blend of methyl ethyl ketone and methanol, or a blend of methyl ethyl ketone and ethanol as the primary jetting solvent. Many commercial inks for non-thermal ink jet applications use methyl ethyl ketone due to its strong solvation properties, preferred surface tension, and fast dry times. The solvent strength of methyl ethyl ketone gives methyl ethyl ketone-based inks access to a wide selection of colorants, resins, co-solvents and additives that are unavailable to weaker solvents, such as alcohols.

The solvent-based thermal ink jet inks disclosed herein preferably have viscosities below 3 cPs, preferably below 2 cPs, at 25° C. Many methyl ethyl ketone-based inks that are optimized for other ink jet technologies (such as continuous ink jet (CIJ) or drop-on-demand (DOD)) jet poorly or not at all in thermal ink jet cartridges. Existing CIJ inks have high resin and/or dye content (and overall high solids), leading to relatively high viscosities of typically 2 to 5 cPs at 25° C. High molecular weight polymers may also impede thermal ink jet jetting performance when used at levels that are typically found in commercial CIJ inks. Careful screening of materials for potential kogation is an important step in thermal ink jet ink evaluation. Existing CIJ inks, if they can be jetted in thermal ink jet systems, have very short decap times (less than 5 or 10 seconds), which makes them commercially infeasible. Inks with very short decap times can create unrecoverable nozzle blockages in thermal ink jet systems and thus lead to premature cartridge failure before target delivered ink volume and expected cartridge end of life is reached. Thus, specific materials and formulation levels are required to create solvent-based thermal ink jet inks that jet well, have good long term reliability, have manageable decap times and do not cause resistor kogation while maintaining short dry times, crisp print quality and excellent adhesive performance on non-porous substrates.

The total amount of the one or more volatile organic solvents can be in any suitable amount, for example, in an amount 50% or more, about 60% or more, about 70% or more, about 80% or more, or about 90% or more by weight of the ink jet ink composition. In an embodiment, the total amount of one or more volatile organic solvents can be present in an amount from 50% to about 99%, preferably from about 60% to about 95%, and more preferably from about 70% to about 90% of the ink jet ink composition. In one embodiment, if water is present in the thermal ink jet ink composition, it is present in an amount up to 49% by weight, up to about 25% by weight, up to about 10% by weight, up to about 5% by weight, or up to about 2% by weight of the ink jet ink composition.

In an embodiment, the one or more volatile organic solvents include methyl ethyl ketone and one or both of ethanol and methanol. The methyl ethyl ketone may be present in an amount up to 90% by weight, up to 85% by weight, or up to 80% by weight of the ink jet ink composition. The methyl ethyl ketone may be present in an amount of at least 60% by weight, at least 70% by weight, or at least 75% of the ink jet ink composition. The ethanol or methanol may be present in an amount up to 90% by weight, up to 85% by weight, or up to 80% by weight of the ink jet ink composition. The ethanol may be present in an amount of at least 70% by weight, at least 80% by weight, or at least 85% of the ink jet ink composition.

The thermal ink jet ink composition can include any suitable colorant or colorants, which may be dye or pigment. In an embodiment, one or more dyes are employed as the colorant, wherein the one or more dyes are selected from the group consisting of acid dyes, basic dyes, solvent dyes, disperse dyes, mordant dyes, reactive dyes and any combination thereof. Examples of solvent dyes include naphthol dyes, azo dyes, metal complex dyes, anthraquinone dyes, quinoimine dyes, indigoid dyes, benzoquinone dyes, carbonium dyes, naphthoquinone dyes, naphthalimide dyes, phthalocyanine dyes, nigrosine dyes and perylene dyes.

In a preferred embodiment, the colorant is a fluorescent material. The fluorescent material preferably has fluorescence in the violet, blue or green regions of the light spectrum. Particularly suitable kinds of invisible fluorescent compounds are sometimes classified as optical brighteners, which are often preferred because they are brightly fluorescent, stable, and have well-established toxicological profiles by virtue of their being widely-used in consumer-oriented applications. The fluorescent material used in the present ink composition is preferably selected from stilbines (e.g. divinyl stilbenes; triazine stilbines; stilbene triazoles; stilbene benzoxazoles, etc.); bezoxazoles (e.g. naphthalene benzoxazoles; bis-benzoxazoles; benzoxazole thiophenes, etc.); bisdiphenylethylenes; coumarins; naphthalimides; 1,3,5-trizin-2-yl derivatives; furans; thiophenes (i.e., benzothiophene); and distyryl derivatives (e.g. distyryl biphenyls, distyryl benzenes, etc.). Particularly suitable fluorescent optical brighteners are oil-soluble varieties such as some benzoxazoles. One specific example is 2,2'-(2,5-Thiophenediyl)bis[5-tert-butylbenzoxazole] with a CAS number of 7128-64-5, sold under the trade name such as Uvitex OB, and Tinopal OB. This compound is often used as a tracer compound in oily media as it is hydrophobic and possesses good solubility in selected polar organic solvents like MEK.

Other preferable fluorescent materials are selected from the classes of xanthene, naphthalimide, and perylene structural varieties. A particularly suitable xanthene fluorescent dye used as a luminescent compound conforms to the structure for C.I. Index Basic Red 11:1 and is sold under the trade name Basonyl Red 560. Another suitable example is C.I Index Solvent Red 49. Other preferred luminescent compounds are fluorescent naphthalimide and perylene dyes sold under the trade name Lumogen from BASF Corporation. One particularly suitable example is Perylene F Red 300 (or 305). Other examples of preferred Perylene dyes are trade named Lumogen F Yellow 083, Lumogen F Yellow 170, Lumogen F Orange 240, Lumogen F Pink 285, Lumogen F Violet 570, and Lumogen F Blue 650.

The thermal ink jet ink composition can include one or more dyes selected from the group consisting of C.I. Solvent Yellow 19, C.I. Solvent Yellow 21, C.I. Solvent Yellow 61, C.I. Solvent Yellow 80, C.I. Solvent Orange 1, C.I. Orange 37, C.I. Orange 40, C.I. Solvent Orange 54, C.I. Solvent Orange 63, C.I. Solvent Red 8, Solvent Red 49, C.I. Solvent Red 81, C.I. Solvent Red 82, C.I. Solvent Red 84, C.I. Solvent Red 100, C.I. Acid Red 92, C. I. Reactive Red 31, Orient Pink 312, C.I. Basic Violet 3, C.I. Basic Violet 4, C.I. Solvent Violet 8, C.I. Solvent Violet 21, C.I. Solvent Blue 2, C.I. Solvent Blue 5, C.I. Solvent Blue 11, C.I. Solvent Blue 25, C.I. Solvent Blue 36, C.I. Solvent Blue 38, C.I. Solvent Blue 55; C.I. Solvent Blue 70, C.I. Solvent Green 3, C.I. Solvent Black 3, C.I. Solvent Black 5, C.I. Solvent Black 7, C.I. Solvent Black 22, C.I. Solvent Black 26, C.I. Solvent Black 27, C.I. Solvent Black 29 (VALIFAST BLACK 3808 or ORASOL BLACK Rum), C.I. Acid Black 123, C.I. Solvent Black 48 (MORFAST BLACK 101™), C.I. Oil Blue 613, and any combination thereof, and preferably one or more dyes selected from the group consisting of C.I. Solvent Black 29 (ORASOL BLACK RLI™), C.I. Solvent Black 27, C.I. Solvent Black 48, C.I. Solvent Black 3 (Oil Black 860), C.I. Basic Violet 3, C.I. Solvent Blue 38, C.I. Solvent Blue 70, C.I. Oil Blue 613, C.I. Solvent Red 49 (ORIENT PINK™ 312), C.I. Solvent Orange 54 (VALIFAST ORANGE™ 3210), and any combination thereof.

Any suitable pigment can be used, for example, one or more pigments selected from the group consisting of phthalocyanine blue, carbon black, mars black, quinacridone magenta, ivory black, prussian blue, cobalt blue, ultramarine blue, manganese blue, cerulean blue, indathrone blue, chromium oxide, iron oxides, viridian, cobalt green, terre verte, nickel azo yellow, light green oxide, phthalocyanine green-chlorinated copper phthalocyanine, burnt sienna, perinone orange, irgazin orange, quinacridone magenta, cobalt violet, ultramarine violet, manganese violet, dioxazine violet, zinc white, titanium white, flake white, aluminum hydrate, blanc fixe, china clay, lithophone, arylide yellow G, arylide yellow 10G, barium chromate, chrome yellow, chrome lemon, zinc yellow, cadmium yellow, aureolin, naples yellow, nickel titanate, arylide yellow GX, isoindolinone yellow, flavanthrone yellow, yellow ochre, chromophthal yellow 8GN, toluidine red, quinacridone red, permanent crimson, rose madder, alizarin crimson, vermilion, cadmium red, permanent red FRG, brominated anthranthrone, naphthol carbamide, perylene red, quinacridone red, chromophthal red BRN, chromophthal scarlet R, aluminum oxide, bismuth oxide, cadmium oxide, chromium oxide, cobalt oxide, copper oxide, iridium oxide, lead oxide, manganese oxide, nickel oxide, rutile, silicon oxide, silver oxide, tin oxide, titanium oxide, vanadium oxide, zinc oxide, zirconium oxide, and any combination thereof.

In embodiments, the pigments are selected from the group consisting of azo pigments, phthalocyanine pigments, quinacridone pigments, dioxazine pigments, isoindolinone pigments, metal oxide pigments, carbon black, and any combination thereof. The pigments can have any suitable particle size, for example, from about 0.005 micron to about 15 microns, preferably from about 0.005 to about 1 micron, and more preferably from about 0.01 to about 0.3 micron.

In any of the embodiments, the colorant, dye, or pigment, or combination thereof, can be present in an amount from about 0.01% to about 10%, preferably from about 0.5% to about 7%, and more preferably from about 1% to about 5% by weight of the ink jet ink composition. The fluorescent material is preferably present in an amount from about 0.05% to about 2% by weight, and more preferably from about 0.01% to about 0.7% by weight of the ink composition. The ink composition can include a single or mixtures of fluorescent materials, single or mixtures of non-fluorescent colorants, and mixtures of one or more of both fluorescent and non-fluorescent colorants.

In any of the embodiments, any suitable humectant can be used. Humectants are additives which maintain a wet environment in the vicinity of the ink jet nozzle during the evaporation process, thus extending the decap time. Preferably, humectants have a boiling point greater than 150° C., greater than 200° C., or greater than 250° C., and/or a relative evaporation rate (with n-butyl acetate=1) less than 1.0, less than 0.9, less than 0.7, less than 0.4, less than 0.1, or less than 0.01. The humectants typically are solvents having one or more polar functional groups such as hydroxyl, ether, amide, ester, ketone, and carbonate, for example, two functional groups, which may be the same or different, such as two hydroxyl groups or one hydroxyl group and one ether group. In an embodiment, the one or more humectants are selected from the group consisting of polyols, glycol ethers, glycol ether acetate, diacetone alcohol, 2-pyrrolidinone, N-methylpyrrolidinone, ethyl lactate, butyl lactate, propylene carbonate, 1,3-dimethyl-2-imidazolidindione, and alkyl esters, and any combination thereof.

For example, the polyol is selected from the group consisting of polyethylene glycol, polypropylene glycol, poly (ethylene-co-propylene glycol), trimethylol propane, ethylene glycol, glycerin, diethylene glycol, triethylene glycol, tripropylene glycol, tetraethylene glycol, pentaethylene glycol, 1,2-propylene glycol, 1,3-propanediol, butylene glycol, triethylene glycol, 1,2,6-hexanetriol, thiodiglycol, hexylene glycol, bis-2-hydroxyethyl ether, 1,4-butanediol, 1,2-butenediol, 1,4-butenediol, 1,3-butenediol, 1,5-pentanediol, 2,4-pentanediol, 2,4-heptanediol, 1,8-octanediol, 1,10-decanediol, 1,12-dodecanediol, 1,4-cyclohexanediol, 1,4-cyclohexanedimethanol, 1,2-bis(hydroxymethyl)cyclohexane, 1,2-bis(hydroxyethyl)-cyclohexane, 3-methyl-1,5-pentanediol, 2,2,4-trimethyl-1,3-pentanediol, neopentyl glycol, pentaerythritol, sorbitol, mannitol, and any combination thereof, and preferably the polyol is selected from the group consisting of polyethylene glycol, trimethylol propane, ethylene glycol, propylene glycol, glycerin, diethylene glycol, tripropylene glycol, and any combination thereof, A preferred humectant is glycol ether, for example, a glycol ether selected from the group consisting of ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol n-propyl ether, tripropylene glycol t-butyl ether, tripropylene glycol n-butyl ether, ethyl cellosolve, methyl cellosolve, polyethylene glycol monomethyl ether, polypropylene glycol monomethyl ether, methoxytriglycol, ethoxytriglycol, butoxytriglycol, 1-butoxyethoxy-2-propanol, ethylene glycol phenyl ether, propylene glycol phenyl ether, diethylene glycol phenyl ether, polyethylene glycol phenyl ether, and any combination thereof, and preferably, the glycol ether is selected from the group consisting of ethylene glycol monomethyl ether, ethylene glycol monoethyl ether, propylene glycol monomethyl ether, propylene glycol monopropyl ether, tripropylene glycol monomethyl ether, ethylene glycol monobutyl ether, diethylene glycol monomethyl ether, diethylene glycol monoethyl ether, and any combination thereof. In certain embodiments, propylene glycol monopropyl ether (Dowanol PnP) is a preferred humectant. In other embodiments, propylene glycol monomethyl ether (Dowanol PM) is a preferred humectant. In other embodiments, diacetone alcohol is a preferred humectant.

Humectants contribute, at least in part, to a feature of the thermal ink jet ink composition. Thus, humectants can lengthen decap times; however, excessive amounts of humectants could increase the dry time of the ink jet ink composition. In any of the embodiments, the one or more humectants can be present in any suitable amount, for example, in an amount about 30% by weight or less, about 25% by weight or less, about 20% by weight or less, about 15% by weight or less, or about 10% by weight or less, of the ink composition. In an embodiment, the one or more humectants are present in an amount at least about 1% by weight, at least about 2% by weight, at least about 5% by weight, or at least about 10% by weight of the ink composition. In an embodiment, the one or more humectants can be present in an amount from about 1% to about 30% by weight, preferably from about 5% to about 25% by weight, and more preferably from about 10% to about 20% by weight of the ink jet ink composition.

As discussed, the thermal ink jet ink composition includes one or more binder resins. Any suitable binder resin, soluble or dispersible, can be employed, preferably a solvent soluble binder resin. In an embodiment, the thermal ink jet ink composition includes one or more binder resins selected from the group consisting of polyamide resins, polyurethane resins, rosin ester resins, acrylic resins, polyvinyl butyral resins, polyesters, phenolic resins, vinyl resins, styrene/acrylate copolymers, cellulose ethers, cellulose nitrate resins, polymaleic anhydrides, acetal polymers, styrene/butadiene copolymers, styrene/methacrylate copolymers, sulfonated polyesters, sulfonamide-modified epoxy resins, sulfonamide-modified formaldehyde resins, sulfonamide-modified melamine formaldehyde resins, aldehyde resins, polyhydroxystyrene resins and polyketone resins, and any combination thereof, and preferably one or more binder resins selected from the group consisting of cellulose nitrate resins, polyamide resins, rosin ester resins, acrylic resins, polyvinyl butyral resins, vinyl resins, polyhydroxystyrene resins, sulfonamide-modified epoxy resins, sulfonamide-modified formaldehyde resins, sulfonamide-modified melamine formaldehyde resins, and any combination thereof. An example of a suitable polyamide resin is ARIZONA 201-150™ available from Arizona Chemical Company, Jacksonville, Fla., or COGNIS VERSAMID 756™, available from Cognis GmbH, Monheim am Rhein, Germany, both of which are alcohol-soluble polyamide resins. Examples of wood rosin ester resins include UNIREZ™ 8115, available as a 40% solution in ethanol from Penn Color, Doylestown, Pa., which is a hydrogenated wood rosin ester, and STAYBELITE™ ESTER 10, available from Chem Central Corporation.

Examples of cellulose nitrate resins are NOBEL™ DLX 3-5 or NOBEL™ DHX 5-8, available from Nobel Enterprises. Examples of polyvinyl butyral resins are PIOLOFORM™ BN18, available from Wacker Chemie AG, and MOWITAL™ B20H available from Kuraray America, Inc. Examples of acrylic and styrene/acrylic resins are Joncryl 611, 682, and 586 (available from BASF, USA) and Paraloid B-66 and B-72 (available from Dow Chemical, USA). Examples of vinyl resins include UCAR VYHH, VMCH, YMCA, and VAGF (available from Dow Chemical Company, USA) and Vinnol E15/45, H14/36, E15/45M, and E16/40A (available from Wacker Chemie AG, Germany). Examples of polyhydroxystyrene resins include poly(p-hydroxy styrene) from DuPont. An example of a sulfonamide-modified epoxy resin is AD-PRO MTS, available from Rit-Chem. Examples of sulfonamide-modified formaldehyde resins are P-TOLUENE SULFONAMIDE FORMALDEHYDE RESIN, available from Jiaxing Chenlong Chemical Company, Ltd. and RIT-O-LITE MHP, available from Rit-Chem.

It has been found that by using binder resins with certain properties, the amount of kogation can be reduced. Kogation is a residue or build-up that deposits on the thermal ink jet firing resistors during use, thus impeding performance via drop weight reduction, misdirected jets, or, in extreme cases, complete loss of nozzle function. Kogation occurs during the high temperatures reached during repetitive resistor heating cycles and is usually attributed to materials in the ink that decompose, react, or become insoluble under these conditions. It has been found that by using binder resins with good solubility properties in the solvent, the effects of kogation can be greatly minimized. In particular, it has been found that certain resins are less prone to kogation in alcohol-based inks; such resins include polyhydroxystyrene, styrene/acrylic resins, rosin-based resins, and synthetic ketone resins, sulfonamide-modified formaldehyde resins and sulfonamide-modified epoxy resins. For ketone-based inks, polymers which are less prone to kogation include nitrocellulose resins, acrylic resins, styrene/acrylic resins, urethane resins, rosin-based resins, silicone resins, sulfonamide-modified formaldehyde resins and sulfonamide-modified epoxy resins.

Kogation may be determined by measuring the drop weight of ink ejected from the nozzles. The onset of kogation can be defined as a consistent reduction in drop weight of greater than 10% from the initial drop weight after 5, 10, 15, 20, or 25 million drops per nozzle actuations. The drop weight loss is measured by jetting a fixed number of drops for a select subgroup of nozzles and monitoring the mass with a high precision scale after each cycle. This process is repeated until the desired level (e.g., 10 or 25 million drops per nozzle level) or higher is reached. A drop weight tester (available from ImTech, Inc., Corvallis, Oreg.) may be used to perform these measurements. The thermal ink jet ink compositions disclosed herein preferably resist kogation such that they can be printed at greater than 10 million drops per nozzle before significant kogation occurs, and more preferably greater than 15 million drops per nozzle, and even more preferably greater than 25 million drops per nozzle.

The polymeric binder resin can be present in any suitable amount, for example, in an amount from about 0.1 to about 30%, preferably from about 0.2 to about 15%, and more preferably from about 0.3 to about 8% of the ink jet ink composition. The polymeric binder resin may have a weight average molecular weight ($M_w$) of less than 250,000, less than 100,000, less than 50,000, less than 25,000, less than 10,000, less than 5000, and less than 3000. While not intending to be bound by theory, it is believed that resins with lower molecular weights tend to re-dissolve more readily and tend to have better decap time when compared to higher molecular weight resins in the same solvent mixtures. Alternatively, sulfonamide-modified polymers resist kogation irrespective of molecular weight. While not intending to be bound by theory, the sulfonamide group may passivate the resistor surface and thus form a bather that impedes kogation.

In a particular embodiment of the thermal ink jet ink composition, the volatile organic solvent or solvents can be present in an amount from about 50% to about 95% by weight, the colorant(s) (dyes, pigments, or a combination thereof), can be present in amount from about 1% to about 8% by weight, the humectant can be present in an amount from about 3% to 30% by weight, and the binder resin can be present in an amount from about 1% to about 15% by weight of the ink jet ink composition.

The thermal ink jet ink composition can further include one or more additives such as surfactants, and plasticizers. Preferably, a polymeric surfactant is employed. Examples of surfactants include modified polysiloxanes, alkyl modified polyoxyalkyleneamines, alkyl modified propoxylated (poly(oxypropylene))diamines, alkyl ether amines, nonyl phenol ethoxylates, ethoxylated fatty amines, fluorinated organic acid diethanolamine salts, alkoxylated ethylenediamines, alkyl modified polyethylene oxides, alkyl modified polyalkyleneoxides, alkyl phosphate ethoxylate mixtures, polyoxyalkylene derivatives of propylene glycol, and polyoxyethylated fatty alcohols. A specific example of a suitable polymeric surfactant is Silicone Fluid SF-69, available from General Electric, which is a blend of silanols and cyclic silicones. Another specific example of surfactant is SILWET L-7622™ which is a siloxane polyalkyleneoxide copolymer (Momentive Performance Chemicals, USA). Fluorosurfactants can also be used to modify surface properties. Examples of fluorosurfactants suitable for thermal inkjet compositions include: Novec 4430 and Novec 4432 (available from 3M); Zonyl FSN, Zonyl FSH, Capstone FS-34, Capstone FS-35, Capstone FS-3100 and Capstone FS-22 (available from DuPont).

In any of the embodiments, the surfactants can be present in an amount from about 0.01 to about 2.0%, preferably from about 0.02 to about 1%, and more preferably from about 0.03 to about 0.5% of the ink jet ink composition.

Examples of suitable plasticizers include phthalate plasticizers, e.g., alkyl benzyl phthalates, butyl benzyl phthalate, dioctyl phthalate, diisobutyl phthalate, dicyclohexyl phthalate, diethyl phthalate, dimethyl isophthalate, dibutyl phthalate, and dimethyl phthalate, esters such as di-(2-ethylhexy)-adipate, diisobutyl adipate, glycerol tribenzoate, sucrose benzoate, dibutyl sebacate, dibutyl maleate, polypropylene glycol dibenzoate, neopentyl glycol dibenzoate, dibutyl sebacate, and tri-n-hexyltrimellitate, phosphates such as tricresyl phosphate, dibutyl phosphate, polyurethanes, and sulfonamide plasticizers such as Plasticizer 8, available from Monsanto Co., St. Louis, Mo., which is n-ethyl o,p-toluene sulfonamide.

In certain embodiments, the plasticizer can be present in an amount from about 0.1 to about 5.0%, preferably from about 0.2 to about 3.0%, and more preferably from about 0.25 to about 2.0% of the ink jet ink composition.

The thermal ink jet ink composition may include additional ingredients such as bactericides, fungicides, algicides, sequestering agents, buffering agents, corrosion inhibitors, antioxidants, light stabilizers, anti-curl agents, thickeners, dispersing agents, conductive salts, and other agents known in the relevant art. In an embodiment, the ink composition is free or substantially free of antioxidants.

The thermal ink jet ink composition has one or more attractive features such as short unassisted dry times of printed alphanumeric or graphic images, long decap times, good adhesion to semi-porous and non-porous substrates, safety, and material compatibility with one or more components of a thermal ink jet printer. In particular, it is desirable that the thermal ink jet ink composition have both a short dry time and a long decap time. For example, embodiments of the thermal ink jet ink composition have a dry time of about 10 seconds or less, such as 7 seconds or less, 5 seconds or less, 4 seconds or less, or 2 seconds or less, on non-porous substrates under ambient conditions. Non-porous substrates include materials such as plastics, metals, glass, and glossy paper. On porous substrates, the dry times are shorter than in semi- or non-porous substrates. For example, embodiments of the thermal ink jet ink composition have a dry time of about 1 second on porous substrates and less than about 5 seconds, preferably less than about 2 seconds, and more preferably less than about 1 second on semi-porous substrates. The thermal ink jet ink composition preferably has a decap time of at least 10 seconds, at least 15 seconds, at least 30 seconds, at least 45 seconds, at least 60 seconds, or at least five minutes, when used in a thermal ink jet print head. In a preferred embodiment, the thermal ink jet ink composition has a decap time of at least 15 seconds and a dry time of less than 5 seconds on non-porous substrates when used in a thermal ink jet print head. Decap time at the microscopic (i.e. droplet) level can be described as the length of time that a nozzle can remain dormant and then be fired again without any significant reduction in droplet velocity, reduction in droplet weight, or change in droplet direction. Decap time at the macroscopic (i.e. print) level is measured as the length of time that a print head can remain dormant and then be fired again without any significant degradation of print quality (i.e., it is the maximum wait time between printing events with no significant change to the printed image after the wait). A specific example of a decap time measurement is the maximum amount of idle time a system can undergo and still recover full nozzle function within the first 20% of a printed stairstep image (i.e. 80% of the print is intact).

The thermal ink jet ink composition can have any suitable viscosity or surface tension. In embodiments of the invention, the thermal ink jet ink composition has a viscosity of less than about 10 cPs, preferably less than about 5 cPs, more preferably less than about 3 cPs, and most preferably less than about 2 cPs, for example, a viscosity from about 0.6 to 4 or from about 0.6 to about 3 cPs at 25° C. In embodiments of the invention, the thermal ink jet ink composition has a surface tension from about 20 to about 50 mN/m, from about 21 to about 40 mN/m, or from about 22 to about 30 mN/m at 25° C. The solids content of the thermal inkjet ink composition may be less than 20% by weight, and is preferably less than 15% by weight.

The thermal ink jet ink composition can be prepared by any suitable method. For example, the chosen ingredients can be combined and mixed with adequate stirring and the resulting fluid filtered to remove any undissolved impurities.

The thermal ink jet ink composition may be used in any suitable thermal ink jet cartridge. The thermal ink jet cartridge is preferably fashioned from materials that are resistant to the solvents used in the thermal ink jet ink composition. Suitable thermal ink jet cartridges are disclosed in U.S. Patent Application Publication 20090303299A1, entitled "INK CONTAINMENT SYSTEM AND INK LEVEL SENSING SYSTEM FOR AN INKJET CARTRIDGE," with a publication date of Dec. 10, 2009, and U.S. Patent Application Publication 20100328398A1, entitled "THERMAL INKJET PRINT HEAD WITH SOLVENT RESISTANCE," with a publication date of Dec. 30, 2010, the contents of which are hereby incorporated by reference.

The present disclosure further provides a method for printing images on a substrate in a thermal ink jet printer comprising directing droplets of any of the embodiments of the thermal ink jet ink composition to a substrate and allowing the ink droplets to dry, thereby printing images on a substrate. Any suitable substrate can be printed in accordance with the invention. Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, metals, glass, coated foils, polymer laminates, foil laminates, and ceramics. The paper substrates can be thin sheets of paper, rolls of paper, or cardboard. Plastics, metals, glass, foils, laminates and ceramic substrates can be in any suitable form such as in the form of bottles or containers, plates, rods, cylinders, etc.

Examples of polymer coating include a coating of polystyrene, polyvinyl alcohol, polyacryate, polymethacrylate, polystryrene or polyvinyl chloride. Examples of polymer film substrates include polyvinyl butyrals, polyolefins, polyvinyl chloride, polyethylene terephthalate, PETG, PETE, polybutylene terephthalate (PBT), polyester, polycarbonate, acrylonitrile-butadiene-styrene (ABS) copolymer, polyvinyl fluoride polymer, polyamides, polyimides, and cellulose. Plastics can be treated plastics (e.g. chemical etch, corona discharge, flame plasma, etc.) or untreated plastics. Examples of metals include aluminum, copper, stainless steel, and metal alloys. Examples of ceramics include oxides, nitrides, and carbides of metals.

The following examples further illustrate the invention but, of course, should not be construed as in any way limiting its scope.

COMPARATIVE EXAMPLES

This example illustrates comparative examples of conventional continuous ink jet formulations. The ink compositions of each of the Comparative Examples were provided in a conventional thermal ink jet cartridge to attempt to jet the inks. Three commercial CU ink compositions from Videojet Technologies Inc. (16-8200, 16-8470 and 16-8530) jetted very poorly or not at all or have decap time of less than 5 seconds in the thermal ink jet cartridge. Thus, it can be seen that conventional continuous ink jet ink compositions are not suitable for use in thermal ink jet cartridges.

Example 1

This example illustrates embodiments of the thermal ink jet ink composition using methyl ethyl ketone as the solvent. The materials employed in preparing the ink jet ink composition, their amounts in percentage, and the formulation numbers are set forth in Table 1 below. Nobel DHX 3-4 is a cellulose nitrate resin with a weight average molecular weight of about 42,000. Joncryl 682 is a styrene/acrylic copolymer with a weight average molecular weight of about 1700. Ad Pro MTS is a sulfonamide-modified epoxy polymer with a weight average molecular weight of about 1700.

K-Plast 1022 is a urethane polymer with a weight average molecular weight of about 7500. DC Silicone resin is a silicone resin with a weight average molecular weight of about 2500. Poly 4-hydroxy styrene resin is a branched polymer with a weight average molecular weight of about 2500. Paraloid B-66 is an acrylic polymer with a weight average molecular weight of about 70,000.

Imtech, Inc. (Corvallis, Oreg.). The onset of kogation is measured as the number of drops fired before the drop weight is consistently reduced by 10% or more from the initial drop weight. It can be seen that all of the ink compositions (except formulations 11903 and 12471) had decap times of at least 90 seconds and acceptable rub

TABLE 1

| Material | 11903 | 12217 | 12418 | 12419 | 12461 | 12463 | 12464 | 12465 | 12471 | 12589 | 12721 | 12722 | 12723 | 12745 |
|---|---|---|---|---|---|---|---|---|---|---|---|---|---|---|
| Methyl ethyl ketone | 73.35 | 75.35 | 75.35 | 75.35 | 75.35 | 75.35 | 75.35 | 75.35 | 77.35 | 85.35 | 85.45 | 85.3 | 85.45 | 85.35 |
| Joncryl 682 | | | 4 | | | | | | | | | | | |
| Ad Pro MTS | | | | 4 | | | | | | 4 | 4 | 4 | 4 | 4 |
| K-Plast 1022 | | | | | 4 | | | 2 | | | | | | |
| DC Silicone Resin | | | | | | 4 | 2 | 2 | | | | | | |
| Nobel DHX 3-4 | 2 | | | | | | | | | | | | | |
| poly 4-hydroxy styrene | | 2 | | | | | | 2 | | | | | | |
| Super Ester A-75 | | 2 | | | | | | | | | | | | |
| Paraloid B-66 | | | | | | | | | 2 | | | | | |
| Propasoll M | 10 | | | | | | | | | | | | | |
| Propasol P | 10 | 10 | 10 | 10 | 10 | 10 | 10 | 10 | 10 | 6 | 6 | 6 | 6 | 6 |
| Diacetone Alcohol | | 6 | 6 | 6 | 6 | 6 | 6 | 6 | 6 | | | | | |
| Silwet-L7622 | 0.10 | 0.1 | 0.1 | 0.1 | 0.1 | 0.1 | 0.1 | 0.1 | 0.1 | 0.1 | | | | 0.1 |
| Silicon Fluid SF-69 | 0.05 | 0.05 | 0.05 | 0.05 | 0.05 | 0.05 | 0.05 | 0.05 | 0.05 | 0.05 | | | | |
| Plasticizer 8 | 0.5 | 0.5 | 0.5 | 0.5 | 0.5 | 0.5 | 0.5 | 0.5 | 0.5 | 0.5 | 0.5 | 0.5 | 0.5 | |
| Novec FC-4430 | | | | | | | | | | | 0.05 | | | 0.05 |
| Capstone FS-35 | | | | | | | | | | | | 0.2 | | |
| Capstone FS-3100 | | | | | | | | | | | | | 0.05 | |
| Orasol Black RLI | 3.25 | 3.25 | 3.25 | 3.25 | 3.25 | 3.25 | 3.25 | 3.25 | 3.25 | 3.25 | 3.25 | 3.25 | 3.25 | 3.25 |
| Valifast Orange 3210 | 0.75 | 0.75 | 0.75 | 0.75 | 0.75 | 0.75 | 0.75 | 0.75 | 0.75 | 0.75 | 0.75 | 0.75 | 0.75 | 0.75 |
| Viscosity (cPs) | 0.94 | 0.76 | 0.82 | 0.82 | 0.91 | 0.80 | 1.15 | 0.94 | 1.11 | 0.72 | 0.67 | 0.70 | 0.69 | 0.83 |
| Specific Gravity | 0.85 | 0.85 | 0.847 | 0.850 | 0.840 | 0.838 | 0.848 | 0.843 | 0.838 | 0.840 | 0.839 | 0.837 | 0.837 | 0.842 |

Table 2 illustrates the average dry time, decap time, rub resistance, and kogation performance for the ink formulations in Table 1. The ink compositions were placed in a thermal ink jet cartridge and ink droplets were ejected for extended periods of time. The drop weights were measured periodically using a drop weight tester available from resistance. Additionally, samples 12418, 12419, 12461, 12463, 12465, 12471, 12589, 12722 and 12723 all were sufficiently resistant to kogation to be able to be fired at least 25 million drops per nozzle of a thermal ink jet printer before a loss in drop weight of 10%.

TABLE 2

| Ink | Decap Time (sec, @ 80% Nozzle Recovery) | Rub Resistance on Aqueous Coat | Rub Resistance on PET | Kogation = drops fired before 10% drop weight loss onset (million drops) nozzle | Dry Time (sec) |
|---|---|---|---|---|---|
| 11903 | 15-30 | Good | Good | 10-15 | <5 |
| 12217 | >300 | Good | Good | 5-10 | >5 |
| 12418 | 90 | Good | Good | >25 | <5 |
| 12419 | 120 | Good | Good | >25 | >5 |
| 12461 | 90 | Good | Good | >25 | <5 |
| 12463 | 120 | Good | Fair | >25 | <5 |
| 12464 | 210 | Good | Good | 5 | <5 |
| 12465 | 210 | Good | Good | >25 | >5 |
| 12471 | 15-30 | Good | Good | >25 | <5 |
| 12589 | 60 | Good | Good | >25 | <5 |
| 12721 | 300 | Good | Good | 15-20 | <5 |
| 12722 | 45 | Good | Good | >25 | <5 |
| 12723 | 300 | Good | Good | >25 | <5 |
| 12745 | 60 | Good | Good | >20 | <5 |

Example 2

This example illustrates embodiments of the thermal ink jet ink composition using an ethanol-based solvent. The materials employed in preparing the ink jet ink composition, their amounts in percentage, and the formulation numbers are set forth in Table 3 below. Nobel DLX 3-5 is a cellulose nitrate resin available from Nobel Enterprises. Mowital LPB16H is a polyvinyl butyral resin available from Kuraray America.

TABLE 3

| | Ink # | | | | | | |
|---|---|---|---|---|---|---|---|
| | 6259 | 6271 | 6272 | 6273 | 6320 | 6321 | 6322 |
| ethanol | 85.45 | 85.45 | 88.45 | 88.45 | 85.35 | 85.35 | 87.35 |
| Propasol P | 6 | 6 | 6 | 6 | 6 | 6 | 6 |
| poly 4-hydroxy styrene | | 4 | | | | 3 | |
| Joncryl 682 | 4 | | | | 4 | | |
| Nobel DLX 3-5 | | | 1 | | | | |
| Mowital LPB16H | | | | 1 | | | |
| Rit-O-Lit MHP | | | | | | | 1 |
| Super Ester A-75 | | | | | | 1 | 1 |
| Plasticizer 8 | 0.5 | 0.5 | 0.5 | 0.5 | 0.5 | 0.5 | 0.5 |
| Silicone Fluid 69 | 0.05 | 0.05 | 0.05 | 0.05 | 0.05 | 0.05 | 0.05 |
| Silwet L7622 | | | | | 0.1 | 0.1 | 0.1 |
| Orasol Black RLI | 3.25 | 3.25 | 3.25 | 3.25 | 3.25 | 3.25 | 3.25 |
| Valifast Orange 3210 | 0.75 | 0.75 | 0.75 | 0.75 | 0.75 | 0.75 | 0.75 |
| total | 100 | 100 | 100 | 100 | 100 | 100 | 100 |
| Viscosity (cPs) | 1.73 | 1.87 | 1.83 | 1.99 | 1.80 | 2.15 | 1.58 |
| Surface Ten (dynes/cm) | 22.3 | 22.3 | 21.6 | 21.5 | 20.5 | 21.4 | 22.9 |
| pH | 4.71 | 5.79 | 5.95 | 6.25 | 4.88 | 5.79 | 5.39 |
| Specific Gravity | 0.815 | 0.821 | 0.81 | 0.81 | 0.828 | 0.835 | 0.814 |

Table 4 illustrates the % loss in drop weight as a function of the number of drops fired per nozzle for the ink formulations in Table 3, measured as previously described. It can be seen that formula 6259, 6271, and 6322 were sufficiently resistant to kogation to be able to be fired at least 10 million drops per nozzle in a thermal ink jet printer with no more then 10% loss in drop weight.

TABLE 4

| Millions of | % loss in drop weight | | | | | | |
|---|---|---|---|---|---|---|---|
| drops fired per nozzle | 6259 | 6271 | 6272 | 6273 | 6320 | 6321 | 6322 |
| 5 M DPN | 3.0% | 3.0% | 1.5% | 17.0% | 4.3% | 7.6% | 9.6% |
| 10 M DPN | 10.0% | −2.3% | 13.2% | 46.4% | 16.0% | 14.9% | 7.4% |
| 15 M DPN | 22.9% | 2.2% | 12.5% | 51.7% | 24.0% | 14.9% | 7.4% |
| 20 M DPN | 30.8% | 9.5% | 3.4% | 54.4% | 27.3% | 15.2% | 6.9% |
| 25 M DPN | 43.8% | 7.2% | 15.0% | 56.5% | 42.7% | 22.0% | 14.1% |
| 30 M DPN | 41.2% | 17.9% | 22.7% | | | | 12.8% |
| Dry Time (s) | <5 | <5 | <5 | <5 | <5 | <5 | <5 |
| Decap Time (s) | 600 | 300 | 120 | 60 | 120 | 120 | 600 |

Example 3

This example illustrates embodiments of the thermal ink jet ink composition using methyl ethyl ketone as the solvent and a fluorescent material as the colorant. The materials employed in preparing the ink jet ink composition, their amounts in percentage, and the formulation numbers are set forth in Table 5 below.

TABLE 5

| Component | Ink 1 | Ink 2 | Ink 3 |
|---|---|---|---|
| Methyl ethyl ketone | 82.88 | 82.88 | 82.78 |
| Ad Pro MTS | 3.63 | 3.63 | 3.63 |
| Glycol Ether PnP | 10.68 | 10.68 | 10.68 |
| Diacetone Alcohol | 1.86 | 1.86 | 1.86 |
| Silwet L7622 | 0.1 | 0.1 | 0.1 |
| Plasticizer 8 | 0.5 | 0.5 | 0.5 |
| Silicone Fluid 69 | 0.05 | 0.05 | 0.05 |
| Tinopal OB | 0.3 | | 0.2 |

TABLE 5-continued

| Component | Ink 1 | Ink 2 | Ink 3 |
|---|---|---|---|
| Fluorescent Brightener 61 | | 0.3 | |
| Solvent Red 149 | | | 0.2 |
| Total | 100 | 100 | 100 |

Tinopal OB, available from CIBA Specialty Chemicals, Inc., is a nearly invisible fluorophore with structure 2,5-thiophenediylbis(5-tert-butyl-1,3-benzoxazole) that fluoresces at roughly 437 nm when excited with UV light. It is insoluble in water, soluble in ketones and slightly soluble in mineral spirits. Fluorescent Brightener 61, available from Unicore Chemical Company, is a nearly invisible coumarin based fluorophore that fluoresces a blue color when excited with UV light and is soluble in ketones, slightly soluble in water and insoluble in mineral spirits. Solvent Red 49 is a visibly red colored xanthene based fluorophore available from Sunbelt Inc. that shows a red emission at around 600 nm when excited with visible light. It is insoluble in water, soluble in ketones, and insoluble in mineral spirits.

Using the inks from Table 5, 2-D Datamatrix codes were printed using a Videojet 8610 thermal inkjet printhead with standard settings. The substrates were non-porous plastic vial caps. For comparison, a commercially available TB water-based inkjet ink (for HP45A type cartridges) was also printed. Inks #1, 2, and 3, were assessed visually for fluorescence intensity by using a handheld low pressure mercury vapor UV lamp. The Datamatrix code readability for each of these three inks was also confirmed by using a Cognex based reading system while the codes were illuminated with the UV source. Each of the Inks 1, 2, and 3 had a dry time of less than 2 seconds, was not removed by a 5 medium thumb rubs across the codes and provided a code with acceptable fluorescence properties. In comparison, the HP45A type ink did not dry within 1 minute and was removed easily by rubbing with a thumb.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A thermal inkjet ink composition for inkjet printing, the ink composition comprising at least 50% by weight volatile organic solvent selected from $C_1$-$C_4$alcohols, $C_3$-$C_6$ketones, $C_3$-$C_6$esters, $C_4$-$C_8$ethers, and mixtures thereof; a colorant; a humectant present in an amount from about 1% to about 30% by weight; from 0.3% to 8% by weight of a binder resin; and not more than 5% by weight water; wherein the ink composition is compatible with components of a thermal ink jet printer.

2. The ink composition of claim 1, wherein the colorant comprises a fluorescent material.

3. The ink composition of claim 2, wherein the fluorescent material comprises an optical brightener.

4. The ink composition of claim 2, wherein the fluorescent material is selected from stilbines, bezoxazoles, bisdiphenylethylenes, coumarins, naphthalimides, 1,3,5-trizin-2-yl derivatives, furans, thiophenes, distyryl derivatives, and mixtures thereof.

5. The ink composition of claim 2, wherein the fluorescent material comprises a benzoxazole.

6. The thermal ink jet ink composition of claim 1, wherein the one or more binder resins are selected from cellulose nitrate resins, polyamide resins, rosin ester resins, acrylic resins, polyvinyl butyral resins, vinyl resins, polyhydroxystyrene resins, silicone resins, sulfonamide-modified epoxy resins, sulfonamide-modified formaldehyde resins, sulfonamide-modified melamine formaldehyde resins, and combinations thereof.

7. The thermal ink jet ink composition of claim 1, wherein the one or more binder resins are selected from rosin ester resins, polyhydroxystyrene resins, silicone resins, sulfonamide-modified epoxy resins, sulfonamide-modified formaldehyde resins, sulfonamide-modified melamine formaldehyde resins, and combinations thereof.

8. The thermal ink jet ink composition of claim 1, wherein the thermal ink jet ink composition has a decap time of at least 60 seconds and a dry time of less than 5 seconds on a non-porous substrate when used in a thermal ink jet print head.

9. The thermal ink jet ink composition of claim 1, wherein the one or more volatile organic solvents are selected from methanol, ethanol, 1-propanol, acetone, methyl ethyl ketone, methyl n-propyl ketone, ethyl acetate, propyl acetate, butyl acetate, and mixtures thereof.

10. The thermal ink jet ink composition of claim 9, wherein the one or more volatile organic solvents are selected from methanol, ethanol, methyl ethyl ketone, and mixtures thereof.

11. The thermal ink jet ink composition of claim 10, wherein the one or more volatile organic solvents comprise methyl ethyl ketone.

12. The thermal ink jet ink composition of claim 11 wherein the methyl ethyl ketone is present in an amount greater than 70% by weight of the ink composition.

13. The thermal ink jet ink composition of claim 9, wherein the one or more volatile organic solvents comprise ethanol.

14. The thermal ink jet ink composition of claim 13 wherein the ethanol is present in an amount greater than 80% by weight of the ink composition.

15. The thermal ink jet ink composition of claim 1, wherein the one or more volatile organic solvents comprise methyl ethyl ketone and one or both of ethanol and methanol.

16. The thermal ink jet ink composition of claim 1, wherein the one or more volatile organic solvents are present in an amount at least 70% by weight of the ink composition.

17. The thermal ink jet ink composition of claim 1, further comprising a humectant present in an amount at least 2% by weight and not more than 30% by weight of the ink composition, wherein the humectant is selected from the group consisting of polyols, glycol ethers, glycol ether acetate, diacetone alcohol, 2-pyrrolidinone, N-methylpyrrolidinone, ethyl lactate, butyl lactate, 1,3-dimethyl-2-imidazolidindione, propylene carbonate, alkyl esters, and mixtures thereof.

18. A thermal ink jet cartridge including the thermal ink jet ink composition of claim 1.

19. A printing system comprising the thermal ink jet ink composition of claim 1.

* * * * *